United States Patent
Kosaka (10) Patent No.: US 12,407,224 B2
(45) Date of Patent: Sep. 2, 2025

(54) MOTOR OIL COOLING STRUCTURE

(71) Applicant: JATCO Ltd, Fuji (JP)

(72) Inventor: Masahiro Kosaka, Ebina (JP)

(73) Assignee: JATCO LTD, Fuji (JP)

( * ) Notice: Subject to any disclaimer, the term of this patent is extended or adjusted under 35 U.S.C. 154(b) by 739 days.

(21) Appl. No.: 17/272,484

(22) PCT Filed: Nov. 8, 2019

(86) PCT No.: PCT/JP2019/043815
§ 371 (c)(1),
(2) Date: Mar. 1, 2021

(87) PCT Pub. No.: WO2020/105467
PCT Pub. Date: May 28, 2020

(65) Prior Publication Data
US 2021/0328480 A1    Oct. 21, 2021

(30) Foreign Application Priority Data
Nov. 20, 2018    (JP) .................................. 2018-217063

(51) Int. Cl.
*H02K 9/19* (2006.01)

(52) U.S. Cl.
CPC ...................... *H02K 9/19* (2013.01)

(58) Field of Classification Search
CPC .. H02K 9/19; H02K 5/20; H02K 3/24; H02K 3/46; H02K 5/04; H02K 9/00; H02K 9/193; H02K 9/197; H02K 1/12; H02K 1/18; H02K 1/20; H02K 3/04; H02K 3/44;
(Continued)

(56) References Cited

U.S. PATENT DOCUMENTS

| | | | |
|---|---|---|---|
| 2010/0052441 A1* | 3/2010 | Fukushima | H02K 9/19 310/54 |
| 2013/0270938 A1* | 10/2013 | Matsuda | B60K 1/04 310/54 |
| 2016/0043619 A1 | 2/2016 | Maekawa | |

(Continued)

FOREIGN PATENT DOCUMENTS

| | | |
|---|---|---|
| DE | 10 2015 223 073 A1 | 5/2017 |
| JP | 2007-312569 A | 11/2007 |

(Continued)

*Primary Examiner* — Christopher M Koehler
*Assistant Examiner* — Ahmed F Seck
(74) *Attorney, Agent, or Firm* — Foley & Lardner LLP (57) ABSTRACT

A motor oil-cooling structure for cooling, with oil, coils wound around split stator cores of a motor includes injection holes arranged in a circumferential direction of the split stator cores. The motor includes a motor case, a rotor rotatably supported by the motor case, and a stator including the split stator cores fixed to the motor case and arranged along a cylindrical outer periphery of the rotor. Each of the injection holes is structured to inject oil toward a corresponding one of coil gaps each of which is formed between two of the split stator cores adjacent to each other. Furthermore, each of the injection holes is structured to inject oil in a direction inclined by a circumferential inclination angle with respect to a direction of a motor axis, wherein oil injected to the coil gaps in the direction of the motor axis passes straight through the coil gaps.

6 Claims, 8 Drawing Sheets

(58) Field of Classification Search
CPC ........ H02K 5/12; H02K 5/203; H02K 44/085; H02K 44/12
See application file for complete search history.

(56) References Cited

U.S. PATENT DOCUMENTS

2016/0322876 A1   11/2016  Horii
2019/0001826 A1*   1/2019  Suzuki .................. B60L 11/14

FOREIGN PATENT DOCUMENTS

| JP | 2010-022082 A | 1/2010 |
| JP | 2010-057261 A | 3/2010 |
| JP | 2015-211543 A | 11/2015 |
| JP | 2016-039694 A | 3/2016 |
| WO | WO-2014/157555 A1 | 10/2014 |
| WO | WO-2015/107679 A1 | 7/2015 |

* cited by examiner

MOTOR OIL COOLING STRUCTURE

TECHNICAL FIELD

The present invention relates to a motor oil-cooling structure for cooling coils wound around split stator cores of a motor, with use of oil.

BACKGROUND ART

Patent Document 1 discloses a conventional example of motor oil-cooling structure for cooling coils with oil wherein the coils are wound around split stator cores. The motor oil-cooling structure includes injection holes arranged in a circumferential direction of the motor and structured to inject oil in an axial direction of the motor and thereby cool the coils respectively. Each of the injection holes is disposed to face a gap between adjacent two of the split stator cores or adjacent two of the coils.

The motor oil-cooling structure disclosed in Patent Document 1 may fail to sufficiently cool the coils, because it may lose track of the coils hit against by the oil, due to errors in directions of the injection holes, and allow one or some of the coils to evade the oil. Furthermore, the motor oil-cooling structure disclosed in Patent Document 1 may fail to sufficiently cool the coils, also because the oil injected to the gap between the coils may pass through the gap intactly without hitting against the coils.

In view of the foregoing, it is desirable to provide a structure that is improved in cooling performance for coils wound around split stator cores, while being still simple.

PRIOR ART DOCUMENT(S)

Patent Document(s)

Patent Document 1: JP 2010-57261 A

SUMMARY OF THE INVENTION

According to one aspect of the present invention, a motor oil-cooling structure for cooling, with use of oil, coils wound around split stator cores of a motor including a motor case, a rotor rotatably supported by the motor case, and a stator including the split stator cores fixed to the motor case and arranged along a cylindrical outer periphery of the rotor includes: injection holes arranged in a circumferential direction of the split stator cores, wherein: each of the injection holes is structured to inject oil toward a corresponding one of coil gaps each of which is formed between two of the split stator cores adjacent to each other; and each of the injection holes is structured to inject oil in a direction inclined by a circumferential inclination angle with respect to a direction of a motor axis, wherein oil injected to the coil gaps in the direction of the motor axis passes straight through the coil gaps.

Due to the configuration of setting each of the oil injection directions with the circumferential inclination angle, the oil injected toward the coil gaps hits against side faces of the coils directly and obliquely, and passes through the coil gaps while drawing heat from the coils. This serves to provide a structure that is improved in cooling performance for the coils wound around the split stator cores, while being still simple.

MODE(S) FOR CARRYING OUT THE INVENTION

The following describes best modes for carrying out a motor oil-cooling structure according to the present invention, with reference to first and second embodiments shown in the drawings.

According to the first embodiment, a motor oil-cooling structure A1 is installed in a drive system of a hybrid vehicle in combination with a transmission unit, and is employed in a travel drive motor or an assist drive motor which requires countermeasures against heat generation in coils. The following describes configurations of the first embodiment dividingly into "Configurations of Motor" and "Detailed Configurations of Motor Oil-cooling Structure".

Figure 1:
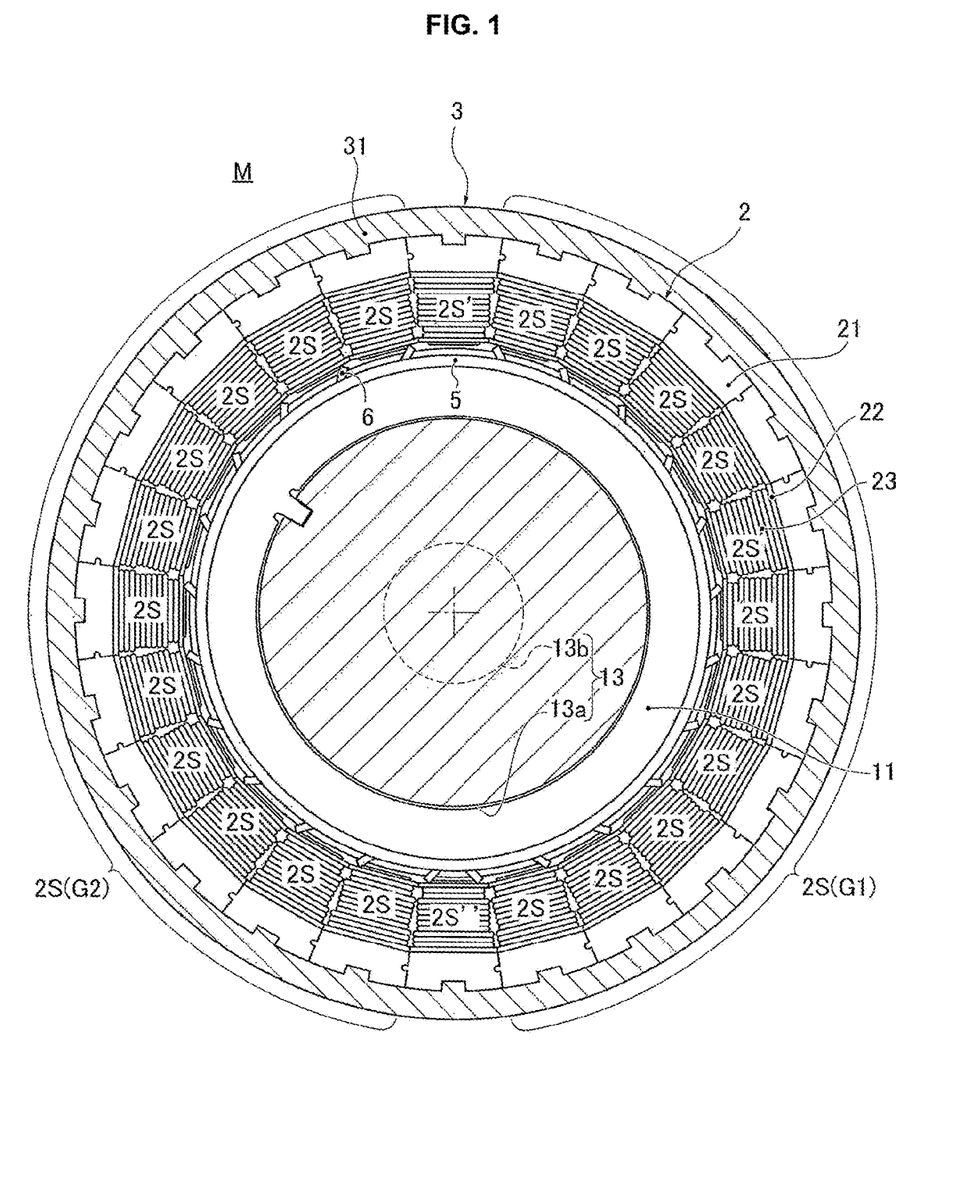
FIG. 1 is a cross sectional side view of a motor employing a motor oil-cooling structure according to a first embodiment.
Figure 2:
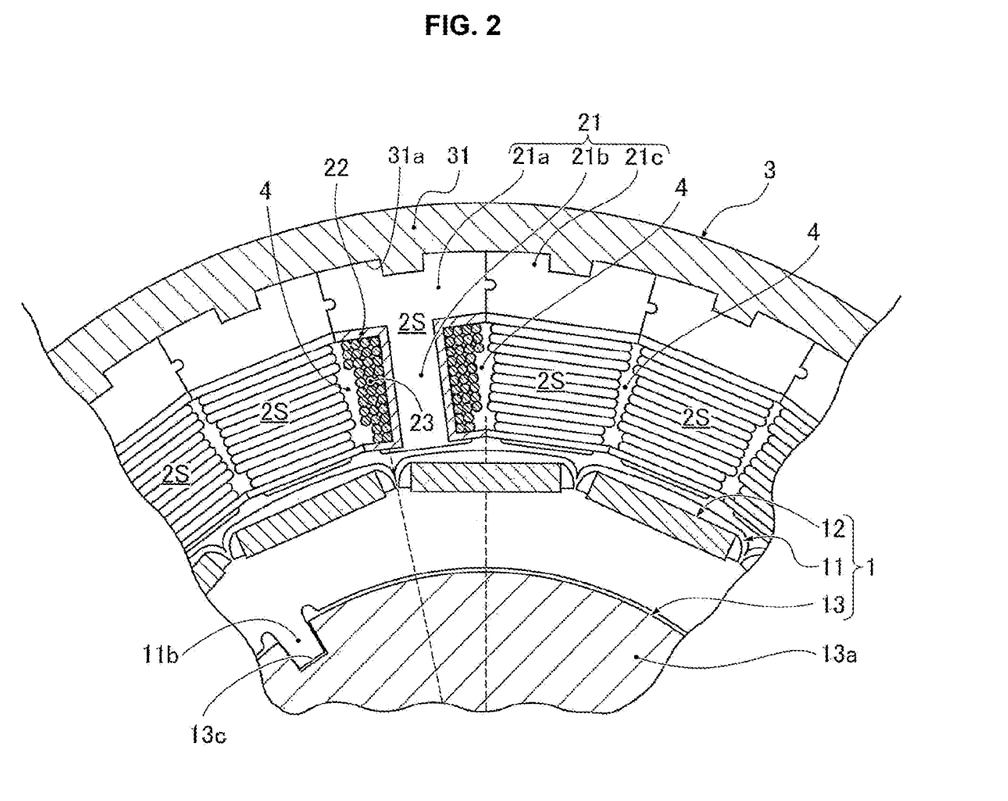
FIG. 2 is an enlarged side view of the motor of the first embodiment which shows coil gaps formed between split stator cores.

[Configurations of Motor] FIG. 1 shows a motor M employing the motor oil-cooling structure A1 according to the first embodiment. FIG. 2 shows coil gaps formed between split stator cores in motor M according to the first embodiment. The following describes configurations of the motor with reference to FIGS. 1 and 2.

Motor M is a motor called a permanent magnet type synchronous motor using three-phase alternating current, and is structured to perform power running and power regeneration. As shown in FIGS. 1 and 2, motor M includes a rotor 1, a stator 2, and a motor case 3.

Rotor 1 is rotatably supported by motor case 3 via a bearing, and includes a rotor core 11, permanent magnets 12, and a motor shaft 13 as shown in FIGS. 1 and 2.

Rotor core 11 is formed by laminating a plurality of rotor core plates in a direction of motor axis, wherein the rotor core plates are formed by punch molding. As shown in FIG. 2, rotor core 11 includes magnet receipt openings 11a and a rotation stop projection 11b. Magnet receipt openings 11a are arranged in an outer peripheral section of rotor core 11. Rotation stop projection 11b projects radially inwardly from an inner periphery of rotor core 11.

As shown in FIG. 2, each of permanent magnets 12 is inserted in a corresponding one of magnet receipt openings 11a in the direction of motor axis, and thereby embedded in and mounted to rotor core 11.

Motor shaft 13 includes a shaft larger-diameter section 13a and a shaft smaller-diameter section 13b. Shaft larger-diameter section 13a fixes rotor core 11. Shaft smaller-diameter section 13b is rotatably supported by motor case 3 via a bearing. Motor shaft 13 further includes a rotation stop groove 13c in shaft larger-diameter section 13a, wherein rotation stop projection 11b is fitted in rotation stop groove 13c. This causes rotor core 11 to be fixed to shaft larger-diameter section 13a.

Stator 2 is fixed to motor case 3, and includes a stator core 21, insulators 22, and coils 23 as shown in FIGS. 1 and 2.

Stator core 21 is formed by laminating a plurality of stator core plates in the direction of motor axis, wherein the stator core plates are formed by punch molding. As shown in FIG. 2, stator core 21 includes a core outer peripheral section 21a, split teeth 21b, and spline projections 21c. Each of split teeth 21b has a shape of tooth projecting from an inner periphery of core outer peripheral section 21a, wherein split teeth 21b are arranged at equal intervals. Each of spline projections 21c is formed in an outer periphery of core outer peripheral section 21a so as to extend in the direction of motor axis. Although core outer peripheral section 21a is shown as a member formed by annularly connecting and assembling fractions split by each of split teeth 21b, core outer peripheral section 21a may be structured as an integrated annular member.

Each of coils 23 is wound around a corresponding one of split teeth 21b of stator core 21, interposing therebetween a corresponding one of insulators 22. Accordingly, each of split stator cores 2S arranged along a cylindrical outer periphery of rotor 1 includes a corresponding one of split teeth 21b, a corresponding one of insulators 22, and a corresponding one of coils 23. Each pair of split stator cores 2S, 2S adjacent to each other form therebetween a coil gap 4 extending in the direction of motor axis. Furthermore, the cylindrical outer periphery of rotor 1 and an inner periphery of each split stator core 2S form an air gap therebetween.

Figure 4:
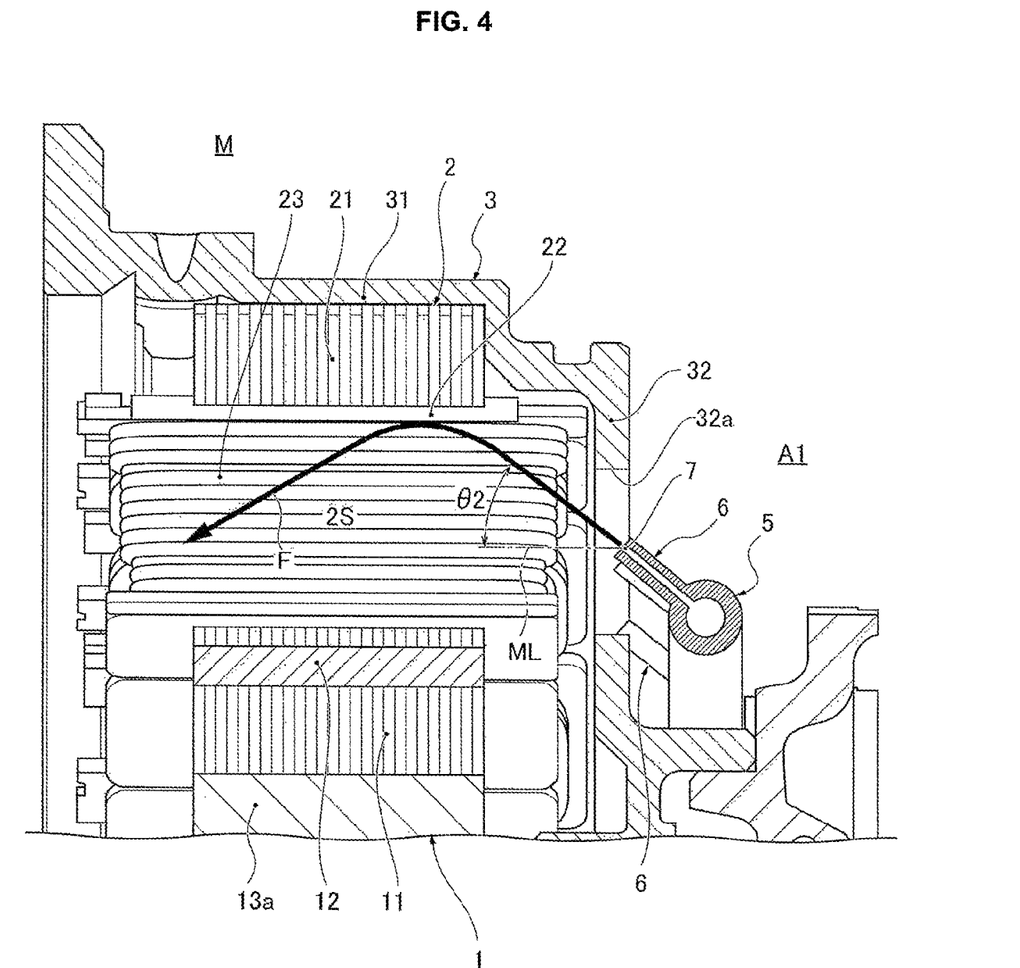
FIG. 4 is an explanatory view of radial inclination angle which shows that each of the oil injection directions from the injection holes is set at a certain radial inclination angle to the motor axis.

Motor case 3 supports rotor 1 rotatably, and fixes stator 2, and includes a case drum portion 31 and a case side portion 32 (see FIG. 4).

Case drum portion 31 includes spline grooves 31a formed in an inner periphery of case drum portion 31. Spline grooves 31a form spline-fittings with spline projections 21c of stator core 21. This causes stator 2 to be fixed to motor case 3.

Case side portion 32 includes an nozzle opening 32a (see FIG. 4) at which oil injection nozzles 6 of motor oil-cooling structure A1 described below are disposed. Motor case 3 is provided with a power supply terminal unit structured to supply electric power of three-phase alternating current from a battery to coils 23 during the power running of motor M, and supply generated electric power of three-phase alternating current from coils 23 to the battery during the power regeneration of motor M.

Figure 3:
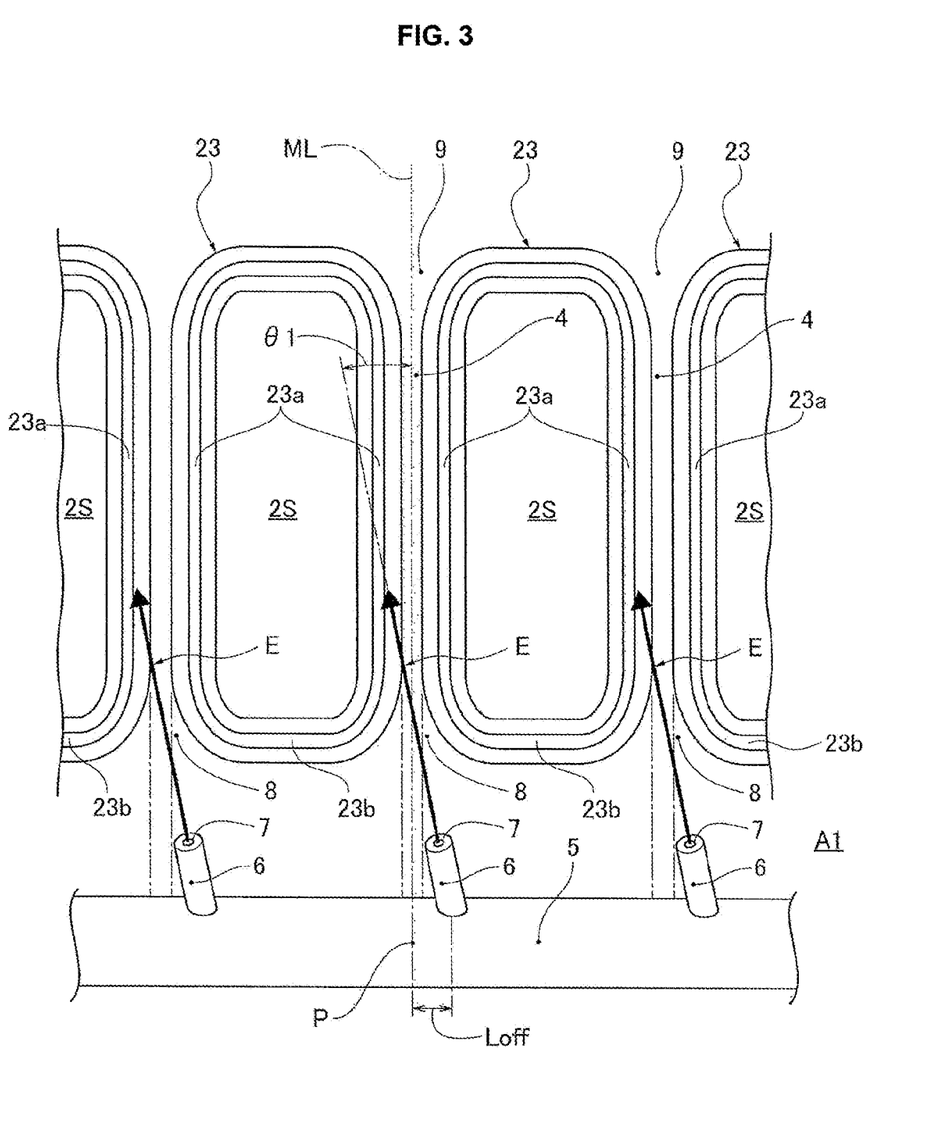
FIG. 3 is an explanatory view of circumferential inclination angle which shows that each of oil injection directions from injection holes is set at a certain circumferential inclination angle to a motor axis.

[Detailed Configurations of Motor Oil-cooling Structure]
FIG. 3 shows that each of oil injection directions from injection holes 7 is set at a circumferential inclination angle θ1 to motor axis ML (i.e. a line parallel with a central axis of the motor). FIG. 4 shows that each of the oil injection directions from injection holes 7 is set at a radial inclination angle θ2 to motor axis ML. In addition, FIG. 3 is an explanatory view unfoldingly showing an inner periphery of stator core 21. FIG. 4 is an explanatory view serving as a longitudinal sectional view of motor M. The following describes detailed configurations of motor oil-cooling structure A1 with reference to FIGS. 1 to 4.

Motor oil-cooling structure A1 according to the first embodiment is structured to cool the coils 23 wound around split stator cores 2S, with oil used in the transmission unit not shown (i.e. transmission hydraulic oil), and includes an annular cooling pipe 5, oil injection nozzles 6, and injection holes 7. The oil for coil cooling is diverted from lubricant oil sent with a lubricating oil pressure generated in an existing oil pump of the transmission unit.

Annular cooling pipe 5 is a pipe through which the oil for coil cooling is supplied from the transmission unit not shown. Annular cooling pipe 5 is disposed adjacently to one of coil end faces of split stator cores 2S. According to the first embodiment, as shown in FIGS. 1 and 4, annular cooling pipe 5 is disposed adjacently to the one of coil end faces of split stator cores 2S, radially inwardly with respect to split stator cores 2S.

As shown in FIGS. 1 and 3, each of oil injection nozzles 6 projects from annular cooling pipe 5, and is disposed with a circumferential offset from a position to face a corresponding one of coil gaps 4. The number of oil injection nozzles 6 (e.g. 24) is equal to the number of coil gaps 4. An amount Loff of the circumferential offset from a coil gap extension position P opposite a corresponding one of coil gaps 4 is determined depending on settings of circumferential inclination angle θ1, widths of coil gaps 4 (i.e. widths of inlet grooves 8), etc. Each of oil injection nozzles 6 is positioned with a setting of the offset amount Loff with respect to annular cooling pipe 5, such that a nozzle tip of the each of oil injection nozzles 6 is apart from a corresponding one of coil gaps 4.

Each of oil injection nozzles 6 includes in its nozzle tip a corresponding one of injection holes 7. Accordingly, the injection holes 7 are arranged in a circumferential direction of split stator cores 2S. Through injection holes 7, the oil is injected toward inlet grooves 8 of coil gaps 4 formed between split stator cores 2S. Each of inlet grooves 8 is defined in an inlet of coil gap 4 by a pair of split stator cores 2S adjacent to each other, so as to be a groove open in a V-shape in which adjacent two of coil ends face each other. The oil injection directions from injection holes 7 toward inlet grooves 8 are determined depending on the offset in position of oil injection nozzles 6 with respect to annular cooling pipe 5 and circumferential inclination angle θ1 of oil injection nozzles 6.

As shown in FIG. 3, each of the oil injection directions from injection holes 7 is set at circumferential inclination angle θ1 with respect to the direction of motor axis ML, wherein oil injected to coil gaps 4 in the direction of motor axis ML passes straight through coil gaps 4. Furthermore, as shown in FIG. 4, each of the oil injection directions from injection holes 7 is set at radial inclination angle θ2 with respect to the direction of motor axis ML, wherein oil injected to coil gaps 4 in the direction of motor axis ML passes straight through coil gaps 4.

In more detail, injection holes 7 are arranged along a circumference inner with respect to split stator cores 2S, and each of the oil injection directions from injection holes 7 is set with circumferential inclination angle θ1 and radial inclination angle θ2 such that each flow of oil injected radially outwardly toward inlet grooves 8 of coil gaps 4 passes a corresponding one of coil gaps 4 while obliquely hitting against a side face 23a (i.e. a coil face facing an adjacent one of the coils) of a corresponding one of coils 23. Thus, the oil injection directions from injection holes 7 are angled such that the injected oil cools side faces 23a of coils 23 overall and thereafter exits to outlet grooves 9. In other words, the oil injection from injection holes 7 is not in directions of coil gaps 4, but in directions angled to allow the injected oil to directly target side faces 23a of coils 23 through inlet grooves 8 open in the V-shapes, even if there are unevenness in position offset and/or nozzle set angle within error ranges. Accordingly, each of injection holes 7 is positioned opposite a front face 23$b$ (i.e. a coil face facing the annular cooling pipe 5) of a corresponding one of coils 23, apart from a front face of a corresponding one of inlet grooves 8 (i.e. apart from a position opposite to a corresponding one of coil gaps 4). This facilitates the angling that allows the direct targeting of side faces 23$a$ of coils 23 through inlet grooves 8 open in the V-shapes even if there are the unevenness in position offset and/or nozzle set angle within error ranges.

As shown in FIG. 1, circumferential inclination angle $\theta 1$ is set such that a split stator core 2S' being a top one of split stator cores 2S receives oil injection from both sides thereof. This is achieved by settings as follows: split stator cores 2S arranged along the cylindrical outer periphery of rotor 1 are divided into a pair of half-around groups, i.e. a first split stator core group 2S (G1) and a second split stator core group 2S (G2), except for the top one 2S' and a bottom one 2S" of split stator cores 2S; and the first split stator core group 2S (G1) and the second split stator core group 2S (G2) are same with each other in value of circumferential inclination angle $\theta 1$ for injection holes 7, and are different from each other in which side the circumferential inclination angle $\theta 1$ for injection holes 7 inclines to. Incidentally, motor M exemplified in the drawing is used in an attitude that the central axis thereof is laid substantially horizontally, for example.

The following describes actions of the first embodiment dividingly into "Background Art and Problems", "Solutions to Problems", and "Oil-cooling Action on Motor Coils".

[Background Art and Problems] There is a known art for cooling stator coils by disposing a water jacket in an outer circumference of a stator and removing heat in the stator coils with use of cooling water flowing in the water jacket. However, the known art using the water jacket is inferior in heat removability because of structure in which the heat of coils is transferred through various components. Specifically, the heat of coils is removed through a transfer path from the stator coils to an insulator, a stator core, a motor case, and then the water jacket.

The known art using the water jacket allows only such indirect heat removal from the coils generating heat, while requiring a cooling water circuit, a water coolant, a water pump, a water piping component, etc. and spaces for them. Thus, the known art has a problem of inferior cooling performance in spite of complexity in component structure which increases the structure in size.

In view of the foregoing, JP 2010-57261 A (i.e. a first comparative example) and JP 2015-211543 A (i.e. a second comparative example) are proposed.

The first comparative example discloses an art for providing an oil-cooling structure including a plurality of injection holes arranged in a circumferential direction of a motor and structured to inject oil in an axial direction of the motor and thereby cool respective coils, wherein each of the injection holes is disposed opposite a coil gap formed between a pair of split stator cores adjacent to each other.

Figure 5:
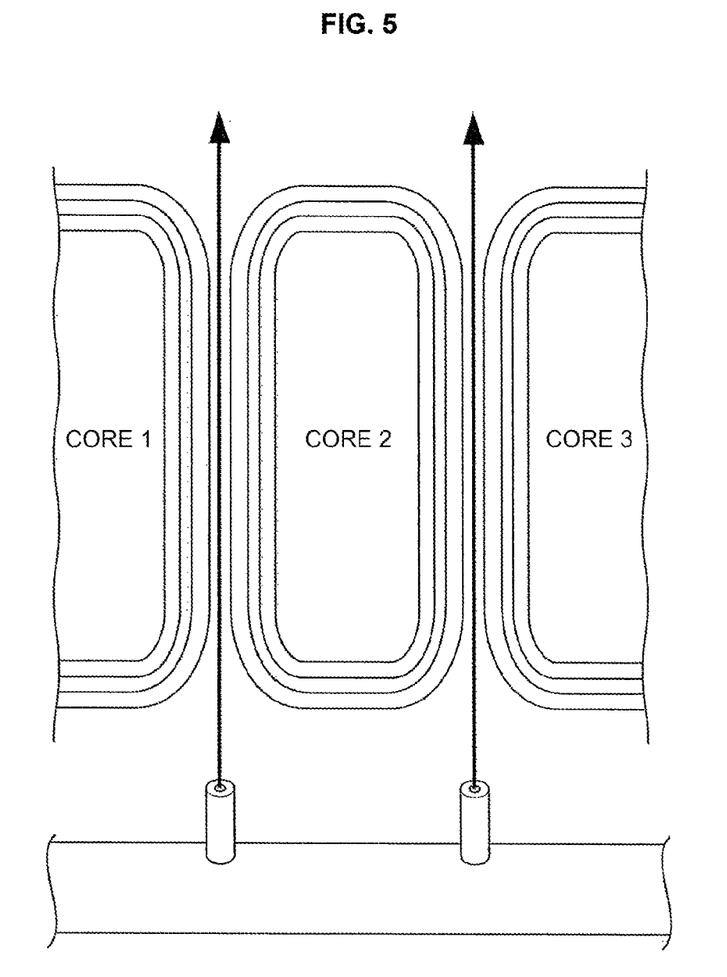
FIG. 5 is an action illustration of a case that oil passes without hitting against coils, due to coincidence of oil injection angles in a first comparative example with directions of coil gaps.
Figure 6:
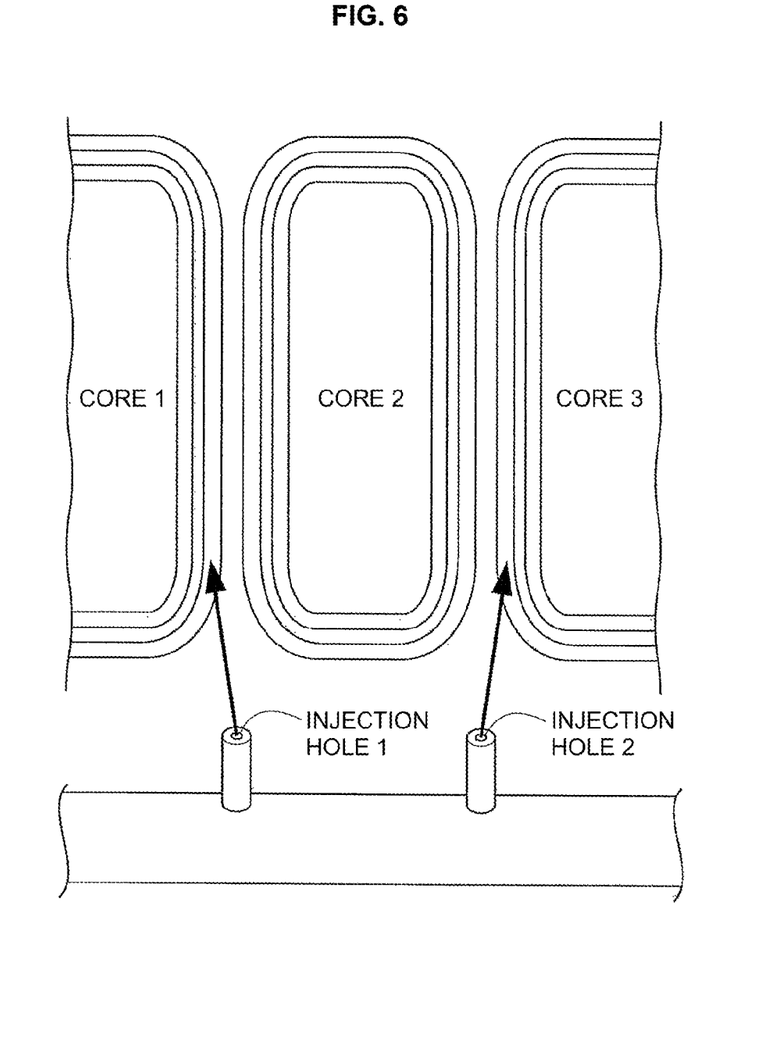
FIG. 6 is an action illustration of a case that oil passes without hitting against the coils, due to unevenness in oil injection angles in the first comparative example.

The oil-cooling structure disclosed in the first comparative example may undergo unevenness in cooling of the coils, because it may lose track of the coils hit against by the oil, due to productive unevenness in directions of the injection holes. As shown in FIG. 5, in case that the injection holes are set to inject oil in directions same with directions of coil gaps, the oil injected to the coil gaps passes through the coil gaps intactly without hitting against the coils of the split stator cores. This results in insufficient cooling of the coils. Furthermore, as shown in FIG. 6, the unevenness in directions of the injection holes may cause oil injection from an injection hole 1 to hit against a core 1 and cause oil injection from an injection hole 2 to hit against a core 3, depending on settings, where the core 1, the core 3, and a core 2 are ones of the split stator cores. This is because the injection directions may be uneven depending on machining accuracy, and some of the injection directions may tilt even though nozzles extend straight. In such case, the oil hits against cores 1 and 3 and does not hit against core 2, and consequently fails to sufficiently cool a coil of the core 2.

The second comparative example proposes an art for providing a cooling structure for a rotary electric machine including a coolant passage pipe that is disposed along an axially outer end face of the rotary electric machine and extends in a circumferential direction around an axis of the rotary electric machine. The coolant passage pipe has a curved shape when viewed at a cross section perpendicular to a path direction of the coolant passage pipe, and includes a plurality of openings communicating with an interior of the pipe. The openings are formed in an outer periphery of the coolant passage pipe, so as to face the axially outer end face of the rotary electric machine. Furthermore, some of the openings are different from each other in angle to a virtual plane in which the coolant passage pipe extends, when viewed at respective cross sections perpendicular to the path direction of the coolant passage pipe.

The cooling structure for the rotary electric machine disclosed in the second comparative example is structured to three-dimensionally pour coolant onto coil ends. This causes the cooling structure to be highly complex. Furthermore, this cooling structure has a problem that the cooling of only the coil ends is insufficient for entire cooling of coils wound around respective split stator cores.

[Solutions to Problems] In view of the problems in the above background arts, the inventor of the present invention focuses on a need to pour coolant oil for coils onto wide areas between the coils because pouring of the oil only onto narrow areas in coil ends is insufficient for heat removal. As a solution of the problems, injection holes 7 structured to inject oil toward coil gaps 4 formed between split stator cores 2S are arranged in the circumferential direction of split stator cores 2S, wherein each of the oil injection directions from injection holes 7 is set at circumferential inclination angle $\theta 1$ to the direction of motor axis ML, wherein oil injected to coil gaps 4 in the direction of motor axis ML passes straight through coil gaps 4.

Due to this configuration of setting each of the oil injection directions with circumferential inclination angle $\theta 1$, the oil injected toward inlet grooves 8 open in the V-shapes between the coil ends hits against side faces 23$a$ of coils 23 directly and obliquely, as shown in FIG. 3. This causes the oil to be poured onto wide areas on side faces 23$a$ of coils 23. The poured oil passes coil gaps 4 while removing heat from coils 23.

The oil is injected to coil gaps 4 of split stator cores 2S. This configuration eliminates necessity for forming a water jacket for a motor case as in the known art using a water jacket, and serves to provide a structure with simplified configurations and a saved space. In particular, according to the first embodiment, the lubricant oil sent with the lubricating oil pressure generated in the existing oil pump in the transmission unit is directly used as the oil poured onto coils 23 of motor M which are heat sources. This configuration eliminates necessity for the oil for coil cooling used as coolant and necessity for a pump for oil only, and allows an oil circuit to be formed with simplified circuit configurations by using a branch from an lubricating oil pressure circuit.

This serves to provide a structure that is simple and is improved in performance for cooling the coils 23 wound around split stator cores 2S: i.e., provide the motor oil-cooling structure A1 that serves for improvement of space efficiency and reduction of components while being improved in coil cooling performance.

[Oil-cooling Action on Motor Coils] In order to suppress the oil injected to coil gaps 4 from intactly passing straight through regions between coils 23, 23, each of the oil injection directions from injection holes 7 is set at circumferential inclination angle θ1 to the direction of motor axis ML, wherein oil injected to coil gaps 4 in the direction of motor axis ML passes straight through coil gaps 4.

As shown by arrows E in FIG. 3, each of injection holes 7 injects oil from the offset position circumferentially shifted from coil gap extension position P set to face a corresponding one of coil gaps 4, so as to suppress the oil from passing straight through the corresponding one of coil gaps 4. Then, the injected oil directly hits against side faces 23a of coils 23 across inlet grooves 8, and enter coil gaps 4 each of which is formed between a pair of coils 23, 23 adjacent to each other. Thereafter, the injected oil is discharged from outlet grooves 9.

This suppresses the injected oil from injection holes 7 from passing by the coils and going out through outlet grooves 9 without hitting against the coils, and thereby allows the injected oil to certainly hit against the coils. This serves to pour the oil onto wide areas between coils 23, which include the coil ends, and thereby efficiently cool the coils 23. Furthermore, the configuration of setting the circumferential inclination angle θ1 for control on the oil injection directions from injection holes 7 serves to clarify which one of coils 23 of adjacent two split stator cores 2S is cooled, even under unevenness errors in the oil injection directions. Thus, this configuration solves unclarity due to the unevenness errors in the oil injection directions, i.e. clarifies which one of coils 23 is cooled, and thereby serves to stabilize the cooling performance.

Furthermore, according to the first embodiment, for expansion of areas in which the oil hits against coils 23, the oil is injected in directions each of which is inclined by radial inclination angle θ2 with respect to the direction of motor axis ML, i.e., with respect to the direction in which oil injected to coil gaps 4 passes straight through coil gaps 4.

An arrow F in FIG. 4 shows that injection hole 7 injects oil at an upward angle such that the oil obliquely crosses a coil face of split stator core 2S. The injected oil that has entered coil gap 4 hits against insulator 22 and coil 23, and thereafter turns to a direction at a downward angle, and is discharged from outlet groove 9 while obliquely crossing a region between a pair of coils 23, 23 adjacent to each other.

The configuration as shown by arrow F in FIG. 4, i.e. the configuration of releasing the oil in directions at oblique angles, causes the oil to hit the coils and rims of insulators 22 and thereafter move parabolically due to gravity etc. and/or drip due to stalling. This serves to perform the oil cooling for wide areas on the side faces of coils 23, and thereby improve the cooling performance.

The oil release angle is not constant because split stator cores 2S around which coils 23 are wound are circumferentially arranged in motor M. For example, the angle is heightened for coils 23 disposed in a top side, and is lowered for coils 23 disposed in a bottom side, and is set middle thereof for coils 23 disposed horizontally. Thus, the angle may be set appropriately for cooling at respective positions. This serves to improve the cooling efficiency.

Figure 7:
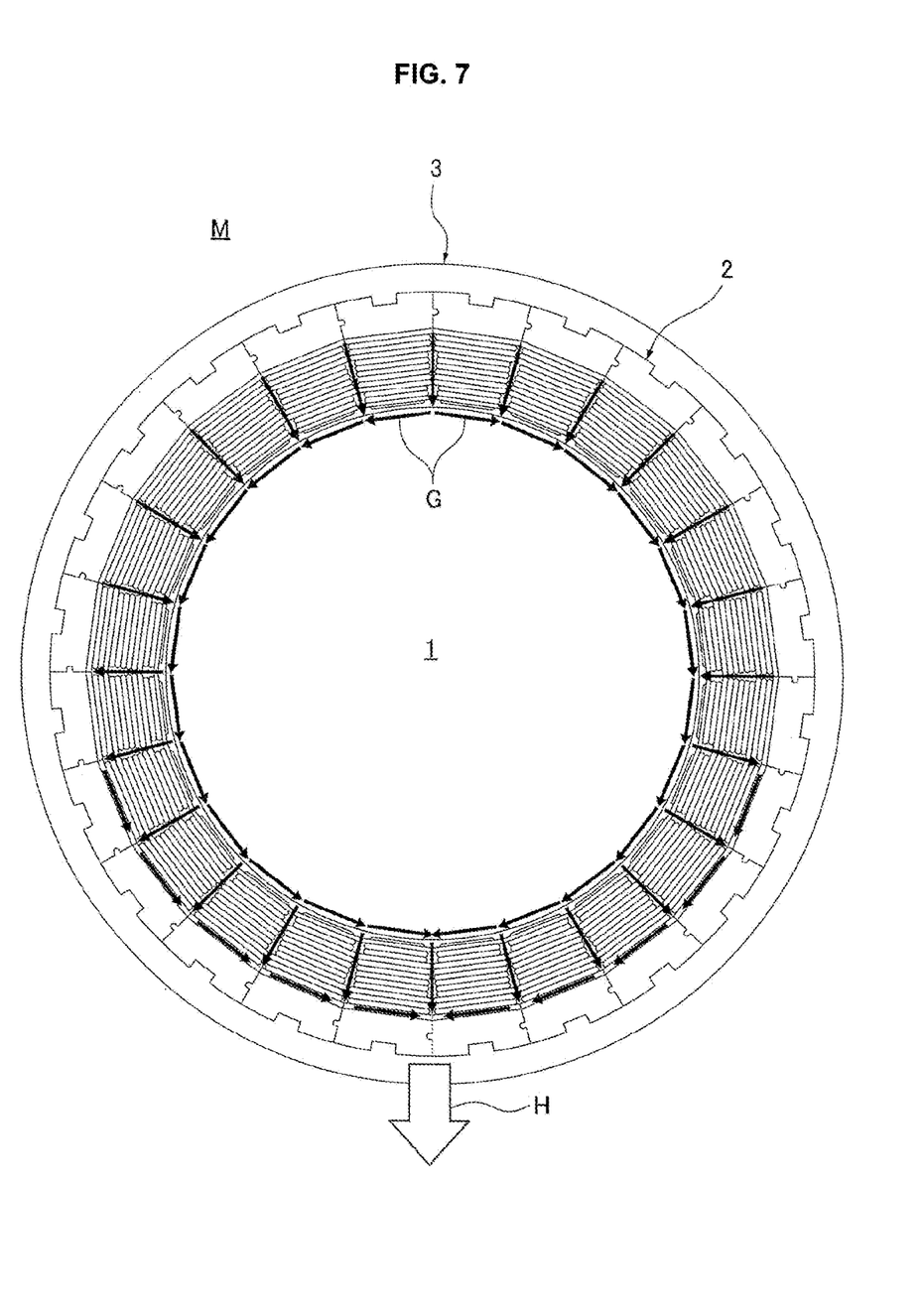
FIG. 7 is an illustration of an oil discharge action for discharging oil that has cooled coils.

The oil that has passed inlet grooves 8 and coil gaps 4 and exited from outlet grooves 9 follows respective paths as shown by arrows G in FIG. 7, and is drained toward an oil pan in the transmission unit as shown by an arrow H in FIG. 7.

Motor oil-cooling structure A1 according to the first embodiment described above causes effects as follows.

(1) Motor oil-cooling structure A1 is structured to cool coils 23 with use of oil, wherein coils 23 are wound around split stator cores 2S of motor M. Motor M includes motor case 3, rotor 1 rotatably supported by motor case 3, and stator 2 including the split stator cores 2S fixed to motor case 3 and arranged along the cylindrical outer periphery of rotor 1. Motor oil-cooling structure A1 includes: injection holes 7 arranged in the circumferential direction of split stator cores 2S. Each of injection holes 7 is structured to inject oil toward a corresponding one of coil gaps 4 each of which is formed between two of split stator cores 2S adjacent to each other. Furthermore, each of injection holes 7 is structured to inject oil in a direction inclined by circumferential inclination angle θ1 with respect to the direction of motor axis ML, wherein oil injected to coil gaps 4 in the direction of the motor axis ML passes straight through coil gaps 4. According to these configurations, the structure is improved in cooling performance for coils 23 wound around split stator cores 2S, while being still simple. Specifically, the oil injected toward coil gaps 4 hits against side faces 23a of coils 23 directly and obliquely, and passes through coil gaps 4 while drawing heat from coils 23.

(2) The direction of oil injection from each of the injection holes 7 is inclined by radial inclination angle θ2 with respect to the direction of the motor axis ML, wherein oil injected to coil gaps 4 in the direction of the motor axis ML passes straight through coil gaps 4. This serves to perform the oil-cooling in wide areas on the side faces of coils 23, and thereby improve the cooling performance. Specifically, the configuration of setting each of the oil injection directions from injection holes 7 with radial inclination angle θ2 causes the oil to obliquely cross coil gaps 4.

(3) Split stator cores 2S arranged along the cylindrical outer periphery of rotor 1 are divided into first split stator core group 2S (G1) and second split stator core group 2S (G2) which are the pair of half-around groups divided at a vertical line. First split stator core group 2S (G1) and second split stator core group 2S (G2) are same with each other in value of circumferential inclination angle θ1 for injection holes 7, and are different from each other in which side the circumferential inclination angle θ1 for injection holes 7 inclines to, such that the vertically top one 2S' of split stator cores 2S receives oil injection from both sides thereof. These configurations serve to improve the cooling performance for the split stator core vertically top one 2S' that rises in temperature to the highest temperature in split stator cores 2S. Specifically, the configuration of injecting oil to the split stator core vertically top one 2S' from the both sides increases an amount of oil injection to coil 23 of the split stator core vertically top one 2S'.

(4) Motor M is disposed inside the transmission unit or in a vicinity of the transmission unit. The oil is the lubricant oil sent with the lubricating oil pressure generated in the oil pump of the transmission unit. These configurations eliminate necessity for oil for coil cooling used as coolant and necessity for a pump for oil only, and allows the oil circuit to be formed with simplified circuit configurations by using a branch from the lubricating oil pressure circuit.

(5) Motor oil-cooling structure A1 further includes: annular cooling pipe 5 disposed adjacently to the one of coil end faces of split stator cores 2S; and oil injection nozzles 6 each of which projects from annular cooling pipe 5 and is positioned with the circumferential offset from a position opposite a corresponding one of coil gaps 4. Each of oil injection nozzles 6 includes a corresponding one of injection holes 7. These configurations allow motor oil-cooling structure A1 to be easily applied to existing motor M by only adding anew the annular cooling pipe 5 including the oil injection nozzles 6.

The following describes a second embodiment. In comparison with the first embodiment showing the motor oil-cooling structure A1 as an external additional structure to motor M which employs a coolant oil passage, the second embodiment shows a motor oil-cooling structure A2 as an internal additional structure incorporated in motor case components themselves.

Figure 8:
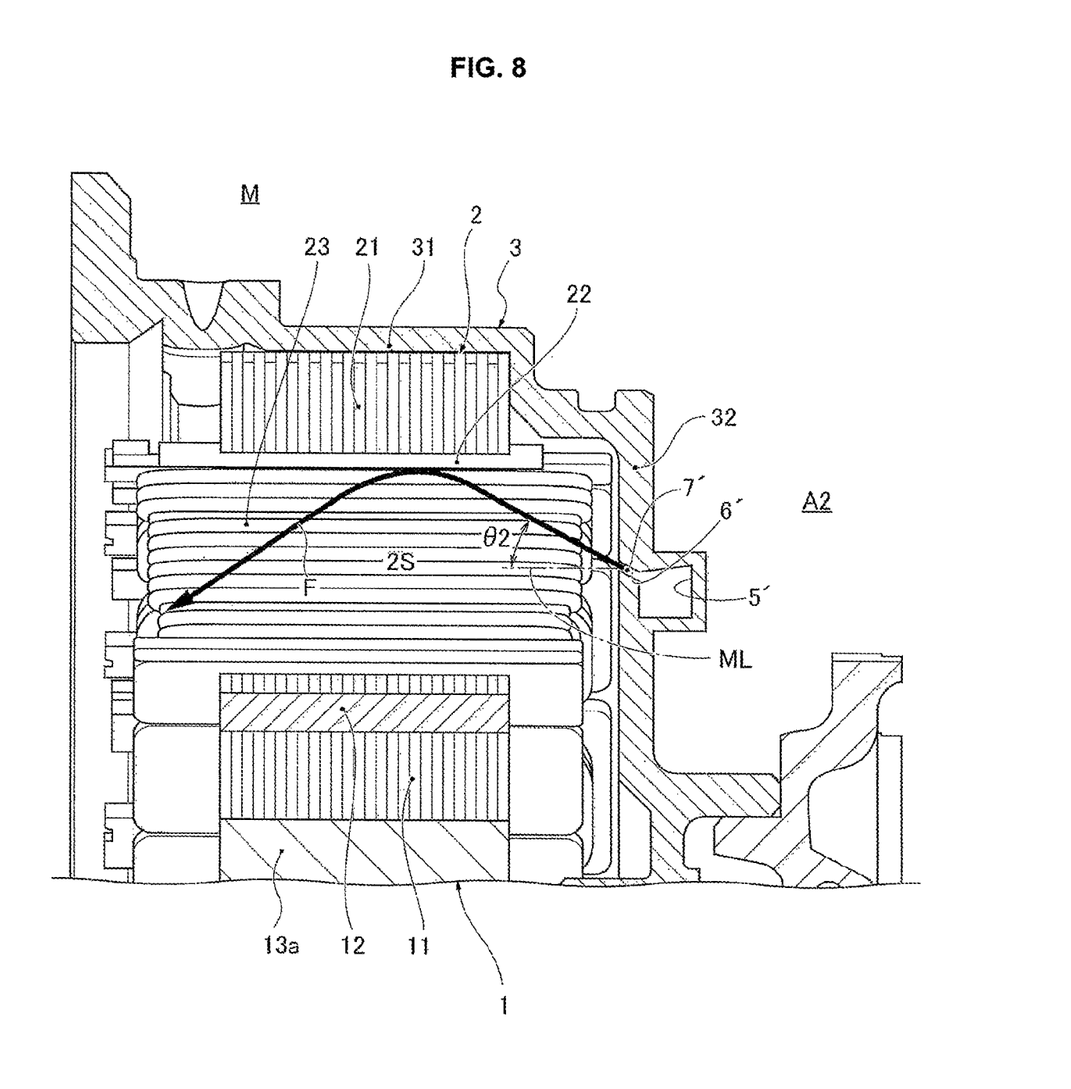
FIG. 8 is a cross sectional view of a motor employing a motor oil-cooling structure according to a second embodiment.

FIG. 8 shows motor M including the motor oil-cooling structure A2 according to the second embodiment. The following describes configurations of oil-cooling structure A2 with reference to FIG. 8.

As shown in FIG. 8, motor oil-cooling structure A2 according to the second embodiment includes an annular cooling oil path 5' formed in case side portion 32, adjacently to coil end faces of split stator cores 2S. Each of oil injection nozzles 6' includes: a first end including an opening open in case side portion 32 so as to establish communication with annular cooling oil path 5'; and a second end including an injection hole 7'. Each of injection holes 7' open in case side portion 32 is structured to inject oil in a direction set with circumferential inclination angle θ1 and radial inclination angle θ2, similarly to the first embodiment.

The other configurations are omitted from explanation and drawing because of their communality to the first embodiment. Furthermore, also explanation and drawing for actions in the second embodiment are omitted because they coincide with the first embodiment by replacing the injection holes 7 with the injection holes 7'.

Motor oil-cooling structure A2 according to the second embodiment described above causes the following effect in addition to the effects (1) to (4) of the first embodiment.

(6) Motor oil-cooling structure A2 includes: annular cooling oil path 5' formed in case side portion 32 of motor case 3, adjacently to the one of coil end faces of split stator cores 2S; and oil injection nozzles 6' each of which includes the first end including the opening open in case side portion 32 so as to establish the communication with annular cooling oil path 5', and includes the second end including a corresponding one of injection holes 7'. This allows motor oil-cooling structure A2 to be easily applied to motor case 3 without increase in number of motor components, by only forming the annular cooling oil path 5', oil injection nozzles 6', and injection holes 7' in motor case 3.

The above describes an oil-cooling structure according to the present invention, with reference to the first and second embodiments. However, specific configurations thereof are not limited to the embodiments, and may be modified for change, addition, etc. of settings, without departing from scope of the invention according to the respective claims.

The first embodiment exemplifies the case that each of the oil injection directions from injection holes 7 is set with circumferential inclination angle θ1 and radial inclination angle θ2. However, each of the oil injection directions from the injection holes may be set with only the circumferential inclination angle.

The first embodiment exemplifies the case that injection holes 7 are arranged such that the top one 2S' of split stator cores 2S receives oil injection from both sides. However, in case that one of the split stator cores includes the coil difficult in heat treatment, such split stator core may be targeted by two injection holes directed to one inlet groove and one coil gap, by utilizing the circumferential position offset of the oil injection nozzles.

According to the first embodiment, an motor oil-cooling structure of the present invention is disposed inside the transmission unit or in a vicinity of the transmission unit, and uses oil diverted from the lubricant oil sent with the lubricating oil pressure generated in the oil pump of the transmission unit. However, an motor oil-cooling structure according to the present invention may be applied to a motor that needs oil for coil cooling used as coolant and a pump for oil only.

The invention claimed is:

1. A motor oil-cooling structure for cooling coils with use of oil, wherein the coils are wound around split stator cores of a motor, wherein the motor includes a motor case, a rotor rotatably supported by the motor case, and a stator including the split stator cores fixed to the motor case and arranged along a cylindrical outer periphery of the rotor, the motor oil-cooling structure comprising:
   injection holes arranged in a circumferential direction of the split stator cores on a plane orthogonal to a motor axis so as to axially face the split stator cores,
   wherein:
   each of the injection holes is structured to inject oil toward a corresponding one of coil gaps each of which is formed between two of the split stator cores adjacent to each other;
   each of the injection holes is positioned to be circumferentially shifted from a position to face the corresponding one of the coil gaps; and
   each of the injection holes is structured to inject oil in a direction inclined by a circumferential inclination angle with respect to a direction of the motor axis, such that the oil injected from the injection holes is directed to side faces of the coils through the coil gaps.

2. The motor oil-cooling structure as claimed in claim 1, wherein the direction of oil injection from each of the injection holes is inclined by a radial inclination angle with respect to the direction of the motor axis, wherein oil injected to the coil gaps in the direction of the motor axis passes straight through the coil gaps.

3. The motor oil-cooling structure as claimed in claim 1, wherein:
   the split stator cores arranged along the cylindrical outer periphery of the rotor are divided into a first split stator core group and a second split stator core group which are a pair of half-around groups divided at a vertical line; and
   the first split stator core group and the second split stator core group are same with each other in value of the circumferential inclination angle for the injection holes, and are different from each other in which side the circumferential inclination angle for the injection holes inclines to, such that a vertically top one of the split stator cores receives oil injection from both sides thereof.

4. The motor oil-cooling structure as claimed in claim 1, wherein:
   the motor is disposed inside a transmission unit or in a vicinity of the transmission unit; and the oil is lubricant oil sent with a lubricating oil pressure generated in an oil pump of the transmission unit.

5. The motor oil-cooling structure as claimed in claim 1, the motor oil-cooling structure further comprising:
   an annular cooling pipe disposed adjacently to one of coil end faces of the split stator cores; and
   oil injection nozzles each of which projects from the annular cooling pipe and is positioned with a circumferential offset from the position opposite a corresponding one of the coil gaps,
   wherein each of the oil injection nozzles includes a corresponding one of the injection holes.

6. The motor oil-cooling structure as claimed in claim 1, the motor oil-cooling structure further comprising:
   an annular cooling oil path formed in a case side portion of the motor case, adjacently to one of coil end faces of the split stator cores; and
   oil injection nozzles each of which includes a first end including an opening open in the case side portion so as to establish communication with the annular cooling oil path, and includes a second end including a corresponding one of the injection holes.

* * * * *